(12) United States Patent
Attar et al.

(10) Patent No.: US 8,838,115 B2
(45) Date of Patent: Sep. 16, 2014

(54) METHOD AND APPARATUS FOR EXPANDED DATA RATE CONTROL INDICES IN A WIRELESS COMMUNICATION SYSTEM

(75) Inventors: Rashid Ahmed Akbar Attar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 11/483,269

(22) Filed: Jul. 6, 2006

(65) Prior Publication Data
US 2007/0022396 A1    Jan. 25, 2007

Related U.S. Application Data

(60) Provisional application No. 60/701,374, filed on Jul. 20, 2005.

(51) Int. Cl.
- *H04W 36/00*  (2009.01)
- *H04W 72/00*  (2009.01)
- *H04W 28/22*  (2009.01)

(52) U.S. Cl.
CPC ................................. *H04W 28/22* (2013.01)
USPC ......... 455/442; 455/436; 455/452.2; 370/332

(58) Field of Classification Search
USPC ................ 370/329, 332; 455/436, 442, 452.2
See application file for complete search history.

(56) References Cited

U.S. PATENT DOCUMENTS

| | | | |
|---|---|---|---|
| 5,923,650 A * | 7/1999 | Chen et al. | 370/331 |
| 6,377,814 B1 | 4/2002 | Bender | |
| 6,477,157 B1 * | 11/2002 | Kim et al. | 370/331 |
| 6,842,619 B2 * | 1/2005 | Lee et al. | 455/453 |
| 7,065,060 B2 * | 6/2006 | Yun et al. | 370/318 |
| 7,068,683 B1 | 6/2006 | Lundby et al. | |
| 7,088,701 B1 | 8/2006 | Attar et al. | |
| 7,280,562 B2 * | 10/2007 | Sindhushayana et al. | 370/474 |
| 7,308,280 B2 * | 12/2007 | Huh et al. | 455/522 |
| 7,317,711 B2 * | 1/2008 | Bae et al. | 370/335 |
| 7,394,789 B2 * | 7/2008 | Sakawa et al. | 370/331 |
| 7,477,622 B2 * | 1/2009 | Attar et al. | 370/329 |

(Continued)

FOREIGN PATENT DOCUMENTS

| | | |
|---|---|---|
| TW | 508960 | 11/2002 |
| WO | 0201761 A1 | 1/2002 |
| WO | 0237890 A2 | 5/2002 |

OTHER PUBLICATIONS

Standard 1xEV-Do Rev A described in document C25-20040527-01: "CDMA2000 High Rate PAcket Air Interface Specification (TIA-856-A)" of the 3rd Generation Partnership Project 2 (3GPP2).*

(Continued)

*Primary Examiner* — Steven Kelley

(74) *Attorney, Agent, or Firm* — Kevin T. Cheatham

(57) ABSTRACT

In one embodiment, the patent application comprises an apparatus, method and means for expanding DRC indices comprising assigning multiple DRC covers to at least one sector. In another embodiment, the apparatus, method and means for expanding DRC indices further comprises creating an expanded DRC indices list, sending a mapping of DRC covers to the expanded DRC indices list to an access terminal, and using the mapping to determine a sector and DRC index from the DRC indices list on requests for transmission from the access terminal.

30 Claims, 14 Drawing Sheets

(56) References Cited

U.S. PATENT DOCUMENTS

| | | | |
|---|---|---|---|
| 7,499,439 B2* | 3/2009 | Li et al. | 370/338 |
| 7,505,438 B2* | 3/2009 | Tayloe et al. | 370/335 |
| 8,249,192 B2* | 8/2012 | Zhou et al. | 375/308 |
| 2002/0097697 A1* | 7/2002 | Bae et al. | 370/335 |
| 2002/0126641 A1* | 9/2002 | Bender | 370/337 |
| 2002/0183066 A1* | 12/2002 | Pankaj | 455/453 |
| 2002/0197959 A1* | 12/2002 | Attar et al. | 455/63 |
| 2003/0039204 A1* | 2/2003 | Tiedemann, Jr. | 370/209 |
| 2003/0072287 A1* | 4/2003 | Bender et al. | 370/335 |
| 2003/0129989 A1* | 7/2003 | Gholmieh et al. | 455/452 |
| 2003/0144000 A1* | 7/2003 | Glazko et al. | 455/436 |
| 2004/0087276 A1* | 5/2004 | Attar et al. | 455/63.4 |
| 2005/0281278 A1* | 12/2005 | Black et al. | 370/412 |
| 2006/0013216 A1* | 1/2006 | Rajkotia et al. | 370/389 |
| 2006/0146721 A1* | 7/2006 | Attar et al. | 370/238 |
| 2006/0176881 A1* | 8/2006 | Ma et al. | 370/392 |
| 2006/0274702 A1* | 12/2006 | Li et al. | 370/338 |
| 2006/0291389 A1* | 12/2006 | Attar et al. | 370/230 |
| 2007/0036121 A1* | 2/2007 | Cherian et al. | 370/342 |
| 2007/0064692 A1* | 3/2007 | Pi et al. | 370/389 |
| 2007/0076784 A1* | 4/2007 | Zhou et al. | 375/141 |
| 2007/0077955 A1* | 4/2007 | Zhou et al. | 455/522 |
| 2007/0197223 A1* | 8/2007 | Jung et al. | 455/436 |
| 2007/0201439 A1* | 8/2007 | Sun et al. | 370/352 |
| 2009/0268704 A1* | 10/2009 | Kim | 370/342 |

OTHER PUBLICATIONS

International Search Report and Written Opinion—PCT/US06/028101, International Search Authority—European Patent Office—Jan. 18, 2007.

Taiwanese Search report—095126540—TIPO—Jun. 28, 2010.

Cdma2000 High Rate Packet Data Air Interface Specification, 3GPP2 C.S0024-A, 3GPP2, Mar. 2004, Chapter 10.7.6.1.5, Chapter 10.8.6.1.5.

Cdma2000 High Rate Packet Data Air Interface Specification, 3GPP2 C.S0024-B, 3GPP2, Apr. 2006, Version 1.0, Chapter 10.7.6.1.5, Chapter 10.8.6.1.5, URL http://www.3gpp2.org/Public_html/specs/C.S0024-B_v1.0_071012.pdf.

Samsung Electronics, Technical Document Discrepancy Report, C20-20060220-125, Feb. 17, 2006, full text, URL http://ftp.3gpp2.org/TSGC/Working/2006/2006-02-Jeju/TSG-C-2006-02-Cheju/WG2/C20-20060220-125_SAM_0006-_AuxDRCCover.doc.

* cited by examiner

METHOD AND APPARATUS FOR EXPANDED DATA RATE CONTROL INDICES IN A WIRELESS COMMUNICATION SYSTEM

CLAIM OF PRIORITY UNDER 35 U.S.C. §119

This application claims benefit of U.S. Provisional Application titled "Method and Apparatus for Expanded Data Rate Control Indices in a Wireless Communication System," filed Jul. 20, 2005 and assigned patent application Ser. No. 60/701, 374, the entire disclosure of this application being considered part of the disclosure of this application.

BACKGROUND

1. Field

The present application for patent relates generally to data rate control indices, and more specifically to the mapping of data rate control indices.

2. Background

Communication systems may use a single carrier frequency or a multiple carrier frequencies. In wireless communication systems, the forward link refers to communications from the network to the remote station, while reverse link refers to communications from the remote station to the network. A Data Rate Control (DRC) channel is used to control the data rate at which data is delivered to an access terminal.

SUMMARY OF THE INVENTION

In view of the above, the described features of the present invention generally relate to one or more improved systems, methods and/or apparatuses for data communications. In one embodiment, the patent application comprises an apparatus, method and means for expanding DRC indices comprising assigning multiple DRC covers to at least one sector.

In another embodiment, the apparatus, method and means for expanding DRC indices further comprises creating an expanded DRC indices list, sending a mapping of DRC covers to the expanded DRC indices list to an access terminal, and using the mapping to determine a sector and DRC index from the DRC indices list on requests for transmission from the access terminal.

In another embodiment, the apparatus, method and means for assigning multiple DRC covers to at least one sector comprises assigning multiple of the DRC covers to each said sector in an active set if the active set size is less than or equal to a threshold; and assigning multiple of the DRC covers to a number of sectors less than the threshold if the active set size is greater than the threshold.

DETAILED DESCRIPTION

Figure 1:
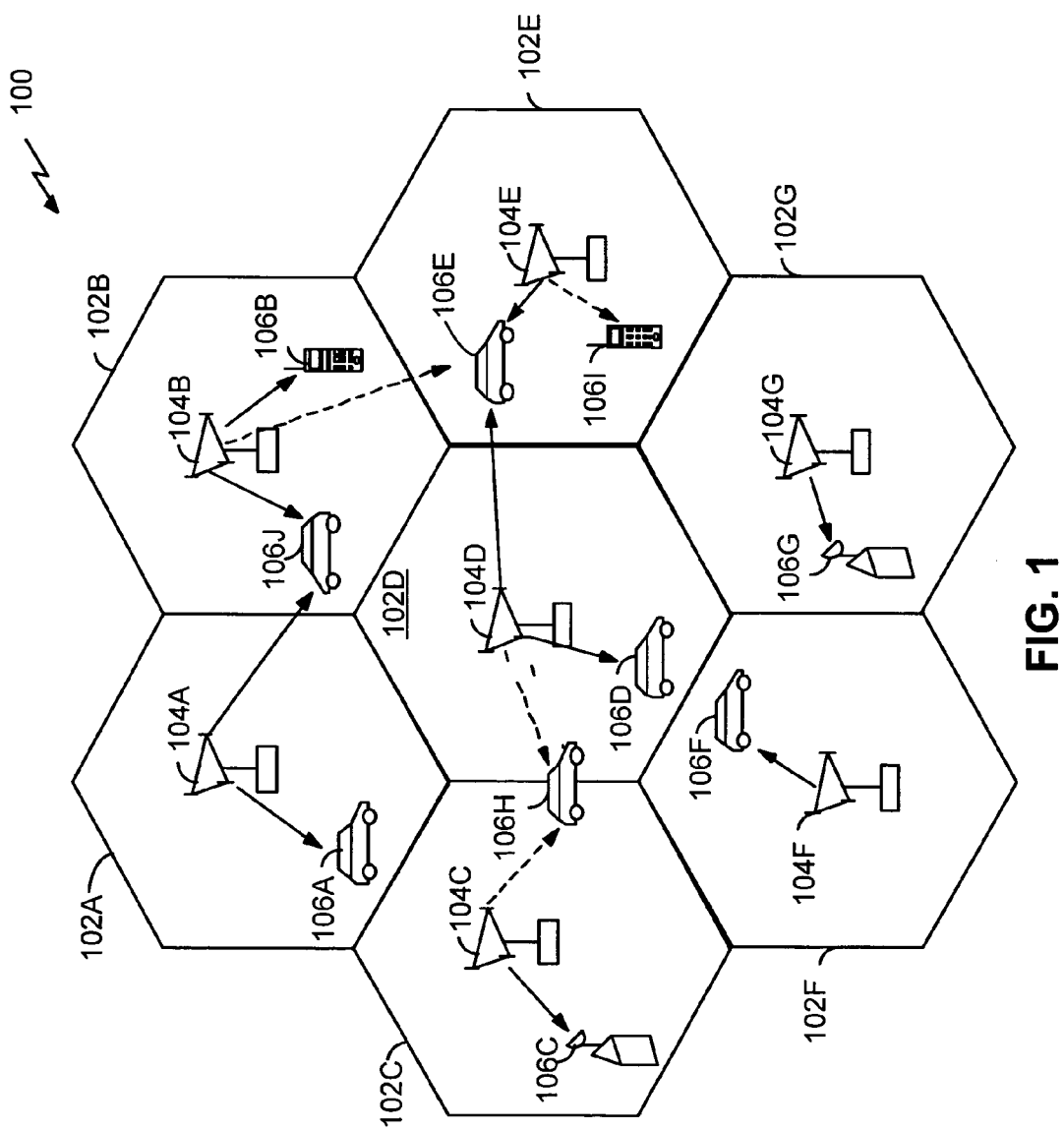
FIG. 1 is a wireless communication system.

A High Data Rate (HDR) subscriber station, referred to herein as an Access Terminal (AT), may be mobile or stationary, and may communicate with one or more HDR base stations (see FIG. 1) referred to herein as Modem Pool Transceivers (MPTs). An access terminal transmits and receives data packets through one or more modem pool transceivers to an HDR base station controller, referred to herein as a Modem Pool Controller (MPC). Modem pool transceivers and modem pool controllers are parts of a network called an access network. An access network (AN) transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

An architecture reference model for a communication system may include an Access Network, AN 122, in communication with an Access Terminal, AT 106, via an air interface. In one embodiment, the system 120 is a Code Division-Multiple Access, CDMA, system having a High Data Rate, HDR, overlay system, such as specified the HDR standard. The AN 122 communicates with an AT 106, as well as any other ATs 106 within system, by way of the air interface. The AN 122 includes multiple sectors, wherein each sector provides at least one Channel. A Channel is defined as the set of communication links for transmissions between the AN 122 and the ATs 106 within a given frequency assignment. A Channel consists of a Forward Link (FL) for transmissions from the AN 122 to the AT 106 and a Reverse Link (RL) for transmissions from the AT 106 to the AN 122.

For data transmissions, the AN 122 receives a data request from the AT 106. The data request specifies the data rate at which the data is to be sent, the length of the data packet transmitted, and the sector from which the data is to be sent. The AT 106 determines the data rate based on the quality of the Channel between the AN 122 and the AT 106. In one embodiment the quality of the Channel is determined by the Carrier-to-Interference ratio, C/I. Alternate embodiments may use other metrics corresponding to the quality of the Channel such as the received signal-to-interference-and-noise ratio (SINR) at the AT 106. The AT 106 provides requests for data transmissions by sending a Data Rate Control, DRC, message via a specific channel referred to as the DRC channel. The DRC message includes a data rate portion and a sector portion. The data rate portion indicates the requested data rate for the AN 122 to send the data, and the sector indicates the sector from which the AN 122 is to send the data. Both data rate and sector information are typically required to process a data transmission. The data rate portion is referred to as a DRC value, and the sector portion is referred to as a DRC cover. The DRC value is a message sent to the AN 122 via the air interface. In one embodiment, each DRC value corresponds to a data rate in kbits/sec having an associated packet length according to a predetermined DRC value assignment. The assignment includes a DRC value specifying a null data rate. In practice, the null data rate indicates to the AN that the AT is not able to receive data. In one situation, for example, the quality of the Channel is insufficient for the AT 106 to receive data accurately.

In operation, the AT 106 may continuously monitor the quality of the Channel to calculate a data rate at which the AT 106 is able to receive a next data packet transmission. The AT 106 then generates a corresponding DRC value; the DRC value is transmitted to the AN 122 to request a data transmission. Note that typically data transmissions are partitioned into packets. The time required to transmit a packet of data is a function of the data rate applied.

This DRC signal also provides the information, which the channel scheduler 132 uses to determine the instantaneous rate for consuming information (or receiving transmitted data) for each of the remote stations 106 associated with each queue. According to an embodiment, a DRC signal transmitted from any remote station 106 indicates that the remote station 106 is capable of receiving data at any one of multiple effective data rates.

Figure 2:
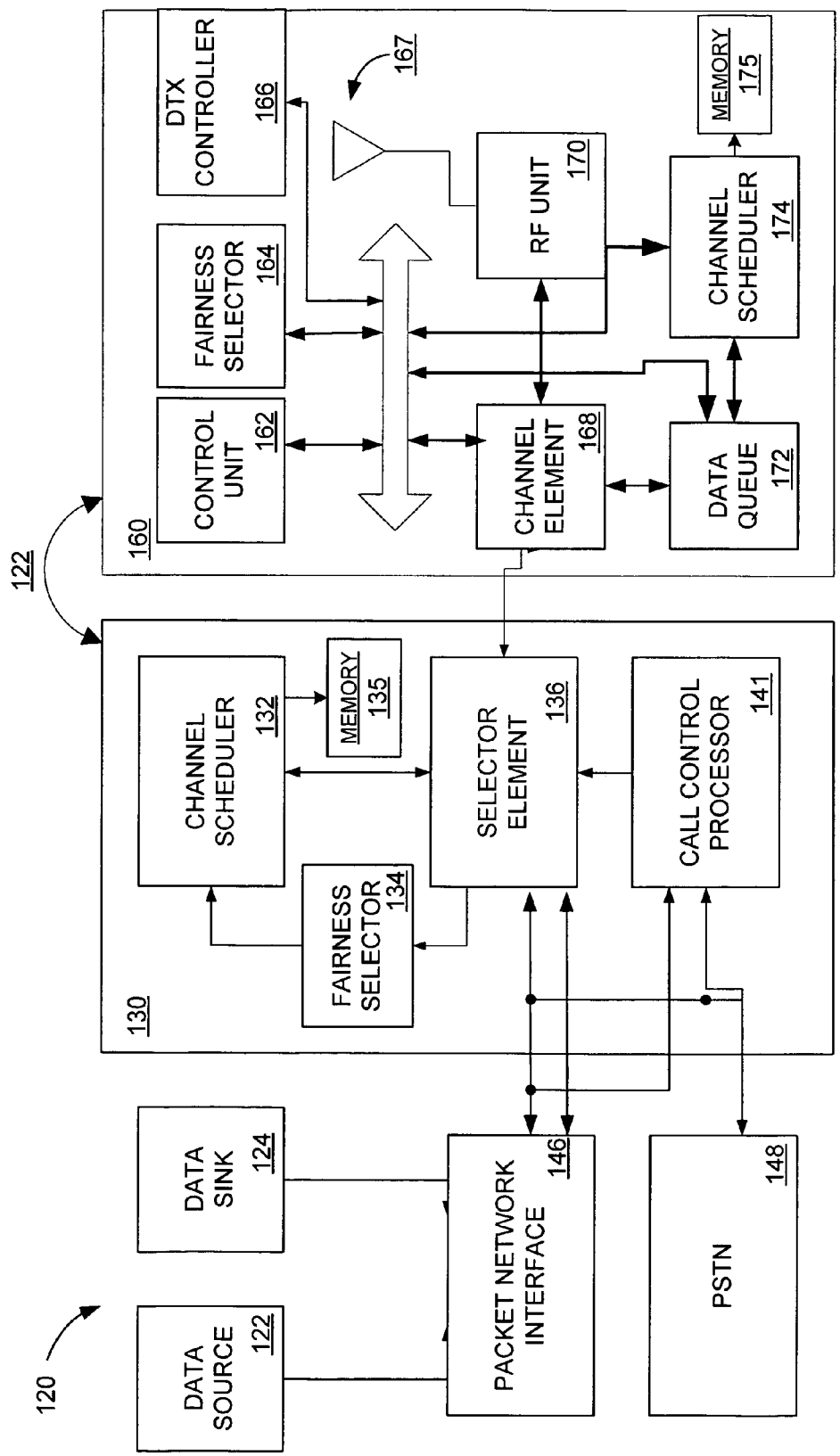
FIG. 2 is a portion of a communication system, including a base station controller and a base station.

One example of a communication system supporting HDR transmissions and adapted for scheduling transmissions to multiple users is illustrated in FIG. 2. FIG. 2 is detailed hereinbelow, wherein specifically, a base station 160 and base station controller 130 interface with a packet network interface 146. Base station controller 130 includes a channel scheduler 132 for implementing a scheduling algorithm for transmissions in system 120. The channel scheduler 132 determines the length of a service interval during which data is to be transmitted to any particular remote station 106 based upon the remote station's 106 associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data Ri determines the service interval length Li associated with a particular data queue.

In addition, the channel scheduler 132 selects the particular data queue for transmission. The associated quantity of data to be transmitted is then retrieved from a data queue 172 and provided to the channel element 168 for transmission to the remote station 106 associated with the data queue 172. As discussed below, the channel scheduler 132 selects the queue 172 for providing the data, which is transmitted in a following service interval using information including the weight associated with each of the queues 172. The weight associated with the transmitted queue 172 is then updated.

Base station controller 130 interfaces with packet network interface 146, Public Switched Telephone Network, Public Switched Telephone Network (PSTN), 148, and all base stations 160 in the communication system 120 (only one base station 160 is shown in FIG. 2 for simplicity). Base station controller 130 coordinates the communication between remote stations 106 in the communication system 120 and other users connected to packet network interface 146 and PSTN 148. PSTN 148 interfaces with users through a standard telephone network (not shown in FIG. 2).

Base station controller 130 contains many selector elements 136, although only one is shown in FIG. 2 for simplicity. Each selector element 136 is assigned to control communication between one or more base stations 160 and one remote station 106 (not shown). If selector element 136 has not been assigned to a given remote station 106, call control processor 141 is informed of the need to page the remote station 106. Call control processor 141 then directs base station 160 to page the remote station 106.

Data source 123 contains a quantity of data, which is to be transmitted to a given remote station 106. Data source 123 provides the data to packet network interface 146. Packet network interface 146 receives the data and routes the data to the selector element 136. Selector element 136 then transmits the data to each base station 160 in communication with the target remote station 106. In the exemplary embodiment, each base station 160 maintains a data queue 172, which stores the data to be transmitted to the remote station 106.

The data is transmitted in data packets from data queue 172 to channel element 168. In the exemplary embodiment, on the forward link, a "data packet" refers to a quantity of data which is a maximum of 1024 bits and a quantity of data to be transmitted to a destination remote station 106 within a predetermined "time slot" (such as $\approx$1.667 msec). For each data packet, channel element 168 inserts the necessary control fields. In the exemplary embodiment, channel element 168 performs a Cyclic Redundancy Check (CRC) encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna 167 to the forward link.

At the remote station 106, the forward link signal is received by an antenna 104 and routed to a receiver 408. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder 410 which performs the inverse of the signal processing functions done at base station 160, specifically the de-interleaving, decoding, and CRC check functions. The decoded data is provided to a data sink 124.

The hardware, as pointed out above, supports variable rate transmissions of data, messaging, voice, video, and other communications over the forward link. The rate of data transmitted from the data queue 172 varies to accommodate changes in signal strength and the noise environment at the remote station 106. Each of the remote stations 106 preferably transmits a Data Rate Control (DRC) signal to an associated base station 160 at each time slot. The DRC signal provides information to the base station 160, which includes the identity of the remote station 106 and the rate at which the remote station 106 is to receive data from its associated data queue 172. Accordingly, circuitry at the remote station 106 measures the signal strength and estimates the noise environment at the remote station 106 to determine the rate information to be transmitted in the DRC signal.

The DRC signal transmitted by each remote station 106 travels through a reverse link channel and is received at base station 160 through a receive antenna 167 coupled to RF unit 170. In the exemplary embodiment, the DRC information is demodulated in channel element 168 and provided to a channel scheduler 132 located in the base station controller 130 or to a channel scheduler 174 located in the base station 160. In a first exemplary embodiment, the channel scheduler 174 is located in the base station 160. In an alternate embodiment, the channel scheduler 132 is located in the base station controller 130, and connects to all selector elements 136 within the base station controller 130.

The FL transmission formats compatible with each DRC index are listed in Table 1 for two sets of protocol subtypes defined in the 1xEV-DO Rel-0 and Revision A specifications, respectively, including proposed changes in recent contributions to Rev-A that defined compatible multi-user formats for DRC indices of 0x0, 0x1, and 0x2. The FL transmission formats compatible with each DRC index are also listed for protocol subtypes defined in the 1xEV-DO Revision B specification in Table 2.

DO Rev. A downlink physical layer packets are defined by their transmission formats. The transmission format is an ordered triple defined by the physical layer packet size (bits), nominal packet duration (slots), and the preamble length (chips). For instance, (128, 16, 1024) indicates that the packet has a 128-bit payload, nominal duration of 16 slots, and a 1024-chip preamble. DO Rev. A introduces new packet sizes of 128, 256, 512, and 5120 bits in addition to the 1024-, 2048-, 3072-, and 4096-bit packet sizes in DO Rel-0. In addition, DO Rev. A permits nominal spans of one through 16 slots, resulting in data rates ranging from 4.8 kb/s to 3.072 Mb/s.

Thus, a transmission format, as in the Rev. A specification, is represented by the triplet (PacketSize, Span, PreambleLength). "PacketSize" is the number of bits the transmission format carries including Cyclic Redundancy Code (CRC) and tail. "Span" is the nominal (e.g., maximum) number of slots which a transmission instance would take up on the forward link. The "PreambleLength" is the total number of preamble chips. As in the Revision A of 1xEV-DO specification, "canonical" transmission formats for each DRC are indicated in bold.

As shown in Table 1, a one-to-one mapping between requested DRC and data rates/packet sizes is used in DO Rel-0. It is noted that Rel-0 defines only single-user transmission formats, whereas certain subtypes in Revision A (and Revision B shown in Table 2) define both single-user and multi-user formats. A multi-user packet (MUP) is a single physical layer packet containing data for multiple ATs (maximum of eight ATs per packet). The downlink scheduler continues to serve single-user packets (SUPs) using opportunistic scheduling to exploit multi-user diversity where possible. Table 2 shows that Revision B also defines both single-user and multi-user formats.

In addition, in Revision A, multiple transmission formats may be defined for DRC indexes. That is, DRC indexes in DO Rev A has a set of associated transmission formats for single-user packet and multi-user packet. For example, DRC index 0x3 is associated with transmission formats (128,4,256), (256,4,256), (512,4,256), and (1024,4,256), where (1024,4, 256) is defined as the canonical transmission format and is the transmission format associated with DRC index 0x3 in DO Rev 0. All the other consistent transmission formats above are called non-canonical transmission formats. A detailed listing of DRC indices and their associated transmission formats is provided in Table 1.

Likewise, DRC indexes in DO Rev B have a set of associated transmission formats for single-user packet and multi-user packet. A detailed listing of DRC indices and their associated transmission formats is provided in Table 2.

The AT 106 tries to receive packets at each of these formats. The multi-user formats are distinguished by their unique MAC indices, i.e., the preamble for each multi-user format uses a distinct Walsh cover. The single-user formats all use the MAC index assigned to a user.

TABLE 1

| Transmission Formats for 1xEV-DO Rel.0 and Rev.A DRC Index | Rate (Kbps) | Rev0 Transmission Format | RevA Single User Transmission Formats | RevA Multi-User Transmission Formats |
|---|---|---|---|---|
| 0x0 | 0.0 | None | (128, 16, 1024), (256, 16, 1024), (512, 16, 1024), (1024, 16, 1024) | None |
| 0x1 | 38.4 | (1024, 16, 1024) | (128, 16, 1024), (256, 16, 1024), (512, 16, 1024), (1024, 16, 1024) | None |
|  |  | (1024, 8, 512) | (128, 8, 512), (256, 8, 512), (512, 8, 512), (1024, 8, 512) |  |
|  | 153.6 | (1024, 4, 256) | (128, 4, 256), (256, 4, 256), (512, 4, 256), (1024, 4, 256) | (128, 4, 256), (256, 4, 256), (512, 4, 256), (1024, 4, 256) |

TABLE 1-continued

| Transmission Formats for 1xEV-DO Rel.0 and Rev.A DRC Index | Rate (Kbps) | Rev0 Transmission Format | RevA Single User Transmission Formats | RevA Multi-User Transmission Formats |
|---|---|---|---|---|
| 0x4 | 307.2 | (1024, 2, 128) | (128, 2, 128), (256, 2, 128), (512, 2, 128), (1024, 2, 128) | (128, 4, 256), (256, 4, 256), (512, 4, 256), (1024, 4, 256) |
| 0x5 | 307.2 | (2048, 4, 128) | (512, 4, 128), (1024, 4, 128), (2048, 4, 128) | (128, 4, 256), (256, 4, 256), (512, 4, 256), (1024, 4, 256), (2048, 4, 128) |
| 0x6 | 614.4 | (1024, 1, 64) | (128, 1, 64), (256, 1, 64), (512, 1, 64), (1024, 1, 64) | (128, 4, 256), (256, 4, 256), (512, 4, 256), (1024, 4, 256) |
| 0x7 | 614.4 | (2048, 2, 64) | (512, 2, 64), (1024, 2, 64), (2048, 2, 64) | (128, 4, 256), (256, 4, 256), (512, 4, 256), (1024, 4, 256), (2048, 4, 128) |
| 0x8 | 921.6 | (3072, 2, 64) | (1024, 2, 64), (3072, 2, 64) | (128, 4, 256), (256, 4, 256), (512, 4, 256), (1024, 4, 256), (2048, 4, 128), (3072, 2, 64) |
| 0x9 | 1228.8 | (2048, 1, 64) | (512, 1, 64), (1024, 1, 64), (2048, 1, 64) | (128, 4, 256), (256, 4, 256), (512, 4, 256), (1024, 4, 256), (2048, 4, 128) |
| 0xA | 1228.8 | (4096, 2, 64) | (4096, 2, 64) | (128, 4, 256), (256, 4, 256), (512, 4, 256), (1024, 4, 256), (2048, 4, 128), (3072, 2, 64), (4096, 2, 64) |
| 0xB | 1843.2 | (3072, 1, 64) | (1024, 1, 64), (3072, 1, 64) | (128, 4, 256), (256, 4, 256), (512, 4, 256), (1024, 4, 256), (2048, 4, 128), (3072, 2, 64) |
| 0xC | 2457.6 | (4096, 1, 64) | (4096, 1, 64) | (128, 4, 256), (256, 4, 256), (512, 4, 256), (1024, 4, 256), (2048, 4, 128), (3072, 2, 64), (4096, 2, 64) |
| 0xD | 1536.0 | None | (5120, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0xE | 3072.0 | None | (5120, 1, 64) | (128, 4, 256), (256, 4, 256), (512, 4, 256), (1024, 4, 256), (2048, 4, 128), (3072, 2, 64), (4096, 2, 64), (5120, 2, 64) |

TABLE 2

| Transmission Formats for 1xEV-DO RevB DRC Index | Rate (Kbps) | RevB Single User Transmission Formats | RevB Multi-User Transmission Formats |
|---|---|---|---|
| 0x00 | 0 | (128, 16, 1024), (256, 16, 1024), (512, 16, 1024), (1024, 16, 1024) | (128, 4, 256), (256, 4, 256), (512, 4, 256), (1024, 4, 256) |
| 0x01 | 38.4 | (128, 16, 1024), (256, 16, 1024), (512, 16, 1024), (1024, 16, 1024) | (128, 4, 256), (256, 4, 256), (512, 4, 256), (1024, 4, 256) |
| 0x02 | 76.8 | (128, 8, 512), (256, 8, 512), (512, 8, 512), (1024, 8, 512) | (128, 4, 256), (256, 4, 256), (512, 4, 256), (1024, 4, 256) |
| 0x03 | 153.6 | (128, 4, 256), (256, 4, 256), (512, 4, 256), (1024, 4, 256) | (128, 4, 256), (256, 4, 256), (512, 4, 256), (1024, 4, 256) |
| 0x04 | 307.2 | (128, 2, 128), (256, 2, 128), (512, 2, 128), (1024, 2, 128) | (128, 4, 256), (256, 4, 256), (512, 4, 256), (1024, 4, 256) |
| 0x05 | 307.2 | (512, 4, 128), (1024, 4, 128), (2048, 4, 128) | (128, 4, 256), (256, 4, 256), (512, 4, 256), (1024, 4, 256), (2048, 4, 128) |
| 0x06 | 614.4 | (128, 1, 64), (256, 1, 64), (512, 1, 64), (1024, 1, 64) | (128, 4, 256), (256, 4, 256), (512, 4, 256), (1024, 4, 256) |
| 0x07 | 614.4 | (512, 2, 64), (1024, 2, 64), (2048, 2, 64) | (128, 4, 256), (256, 4, 256), (512, 4, 256), (1024, 4, 256), (2048, 4, 128) |
| 0x08 | 921.6 | (1024, 2, 64), (3072, 2, 64) | (128, 4, 256), (256, 4, 256), (512, 4, 256), (1024, 4, 256), (2048, 4, 128), (3072, 2, 64) |
| 0x09 | 1228.8 | (512, 1, 64), (1024, 1, 64), (2048, 1, 64) | (128, 4, 256), (256, 4, 256), (512, 4, 256), (1024, 4, 256), (2048, 4, 128) |
| 0x0a | 1228.8 | (4096, 2, 64) | (128, 4, 256), (256, 4, 256), (512, 4, 256), (1024, 4, 256), (2048, 4, 128), (3072, 2, 64), (4096, 2, 64) |
| 0x0b | 1843.2 | (1024, 1, 64), (3072, 1, 64) | (128, 4, 256), (256, 4, 256), (512, 4, 256), (1024, 4, 256), (2048, 4, 128), (3072, 2, 64) |
| 0x0c | 2457.6 | (4096, 1, 64) | (128, 4, 256), (256, 4, 256), (512, 4, 256), (1024, 4, 256), (2048, 4, 128), (3072, 2, 64), (4096, 2, 64) |
| 0x0d | 1536.0 | (5120, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0x0e | 3072.0 | (5120, 1, 64) | (128, 4, 256), (256, 4, 256), (512, 4, 256), (1024, 4, 256), (2048, 4, 128), (3072, 2, 64), (4096, 2, 64), (5120, 2, 64) |
| 0x0f | 460.8 | N/A | NA |
| 0x10 | 460.8 | (1024, 4, 64), (2048, 4, 64), (3072, 4, 64) | (128, 4, 256), (256, 4, 256), (512, 4, 256), (1024, 4, 256), (2048, 4, 128) |
| 0x11 | 614.4 | (1024, 4, 64), (2048, 4, 64), (4096, 4, 64) | (128, 4, 256), (256, 4, 256), (512, 4, 256), (1024, 4, 256), (2048, 4, 128) |
| 0x12 | 768.0 | (1024, 4, 64), (2048, 4, 64), (5120, 4, 64) | (128, 4, 256), (256, 4, 256), (512, 4, 256), (1024, 4, 256), (2048, 4, 128) |
| 0x13 | 921.6 | (2048, 4, 64), (6144, 4, 64) | (128, 4, 256), (256, 4, 256), (512, 4, 256), (1024, 4, 256), (2048, 4, 128) |
| 0x14 | 1075.2 | (1024, 4, 64), (7168, 4, 64) | (128, 4, 256), (256, 4, 256), (512, 4, 256), (1024, 4, 256), (2048, 4, 128) |
| 0x15 | 1228.8 | (8192, 4, 64) | (128, 4, 256), (256, 4, 256), (512, 4, 256), (1024, 4, 256), (2048, 4, 128) |
| 0x16 | 1843.2 | (2048, 2, 64), (6144, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0x17 | 2150.4 | (1024, 2, 64), (7168, 2, 64) | (128, 4, 256), (256, 4, 256), (512, 4, 256), (1024, 4, 256), (2048, 4, 128), (3072, 2, 64), (4096, 2, 64), (5120, 2, 64) |
| 0x18 | 2457.6 | (8192, 2, 64) | (128, 4, 256), (256, 4, 256), (512, 4, 256), (1024, 4, 256), (2048, 4, 128), (3072, 2, 64), (4096, 2, 64) |
| 0x19 | 3686.4 | (2048, 1, 64), (6144, 1, 64) | (128, 4, 256), (256, 4, 256), (512, 4, 256), (1024, 4, 256), (2048, 4, 128), (3072, 2, 64), (4096, 2, 64), (5120, 2, 64) |

TABLE 2-continued

| Transmission Formats for 1xEV-DO RevB DRC Index | Rate (Kbps) | RevB Single User Transmission Formats | RevB Multi-User Transmission Formats |
|---|---|---|---|
| 0x1a | 4300.8 | (1024, 1, 64), (7168, 1, 64) | (128, 4, 256), (256, 4, 256), (512, 4, 256), (1024, 4, 2560, (2048, 4, 128), (3072, 2, 64), (4096, 2, 64), (5120, 2, 64) |
| 0x1b | 4915.2 | (8192, 1, 64) | (128, 4, 256), (256, 4, 256), (512, 4, 256), (1024, 4, 256), (2048, 4, 128), (3072, 2, 64), (4096, 2, 64), (5120, 2, 64) |

As a reminder, a transmission instance refers to a transmission format with a particular set of bits from one or more queues 172 selected to be transported by it. A candidate transmission instance refers to a transmission instance to be evaluated by a scheduler 174 algorithm for possible transmission. The multi-user transmission formats (1024,4,256), (2048,4,128), (3072,2,64), (4096,2,64), and (5120,2,64) are referred to as the canonical multi-user transmission formats. The multi-user transmission formats (128,4,256), (256,4,256), and (512,4,256) are referred to as "non-canonical multi-user formats." The derived transmission formats are obtained simply by setting the span of the corresponding defined format to smaller values than the nominal value (as if obtained from the defined formats by early termination). In summary, transmission formats and instances may be canonical or non-canonical; single-user, or multi-user; and defined or derived. The term "nominal number of slots" will be used to refer to the maximum number of slots for a defined transmission format and the redefined maximum number of slots for a derived transmission format.

In a system supporting link adaptation for high speed packet data transmissions, and supporting an ever increasing number of users, each having specific desired transmissions and criteria, it may be desirable to provide an even larger number of DRC indices. This adds to the granularity of data rates, allowing for rates between existing or current designated rates, such as those given in Table 1 hereinabove. Further, allowing expanded DRC indices list allows for a finer granularity in determining FL data rates, and therefore may allow higher peak data rates, and improve Hybrid ARQ (H-ARQ) gain.

A barrier to increasing the list of DRC indices is the size of the field used for transmission of the DRC indices in some current implementations. For example, in 1xEV-DO Rev. A, the DRCIndex is a 4-bit field, which results in a maximum of 16 possible DRC indices, $2^4=16$. In one embodiment, there is, however, a list of 32 DRC indices for use. If a DRC cover is provided as a 3-bit value, wherein the DRC cover serves to indicate a desired forward link serving sector, there are a potential of 8 DRC covers, $2^3=8$. One DRC cover is reserved as a NULL cover, the DRC cover=0x0. Excluding the NULL cover, there are then 7 DRC cover values possible to represent 7 possible sectors within a cell 102. In such a system, the AT 106 sends information to the AN 122 to: i) select a serving sector, wherein such selection may be made based on link quality comparisons; and ii) identify a desired or maximum data rate for transmissions on the forward link from the selected serving sector.

Figure 4:
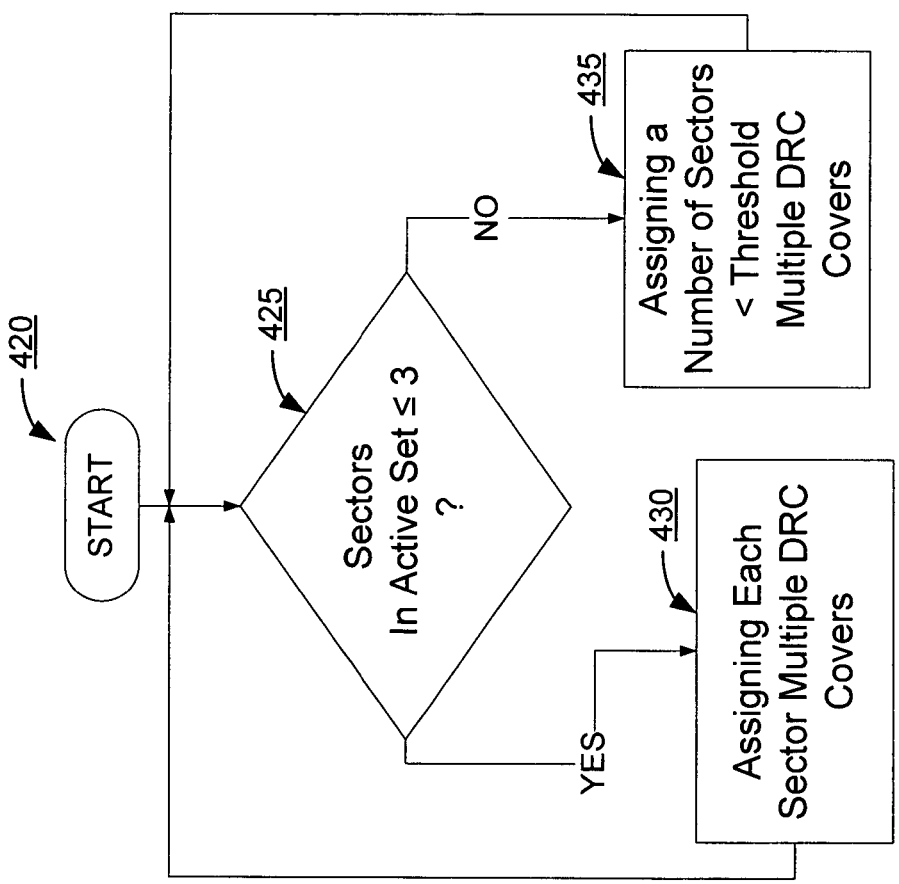
FIG. 4 is a flowchart illustrating the steps executed when assigning multiple DRC Covers to a single sector.

To increase the number of DRC indices while using the limitations of a current system, a first embodiment assigns multiple DRC covers to each sector. If the active set size is less than or equal to 3 sectors, each sector in the active set is assigned two DRC covers. This would use a maximum of 6 covers, plus one for the NULL cover. If the active set size is greater than 3, then only some sectors in the active set are assigned two DRC covers, as there are not sufficient DRC covers to provide two to each sector. The present embodiment allows multiple DRC covers to identify a single sector. There are a variety of ways to allocate the DRC covers to the sectors in the active set. One embodiment is illustrated in FIG. 4. Using a 2-DRC cover assignment for the AN's 122 sectors allows the DRC indices to be in range 0-15 if one of the DRC covers is assigned and 16-31 if the other DRC cover is assigned. As stated above, in 1xEV-DO Rev. A, the DRCIndex is a 4-bit field, which results in a maximum of 16 possible DRC indices, $2^4=16$, or 0-15 for the first cover and 16-31 for the second cover.

In FIG. 4, the AT starts (step 420) assigning multiple DRC covers to each sector by first determining whether the number of sectors in the active set is less than or equal to a threshold (which in this embodiment is 3) (step 425). If the answer to step 425 is yes, then assign each sector all DRC covers (which in this embodiment is 2 DRC covers) (step 430). If the answer to step 425 is no, then assign some sectors 2 DRC covers (step 435).

The AT 106 receives the forward pilot channels of cells and sectors as the AT 106 moves among these different cells and sectors. The AT 106 uses a route update protocol to track the different pilots from each cell to maintain the air link. In doing so, the route update protocol (at the AT 106) maintains four pilot sets specified by the pilot's PN offset, the active set, the candidate set, the neighbor set and the remaining set. On the reverse link, the AT 106 transmits a Route Update Message. The AT 106 uses the Route Update Message to inform the AN 122 of the ATs 106 local radio conditions (e.g., the number of pilots the AT 106 sees).

Figure 5A:
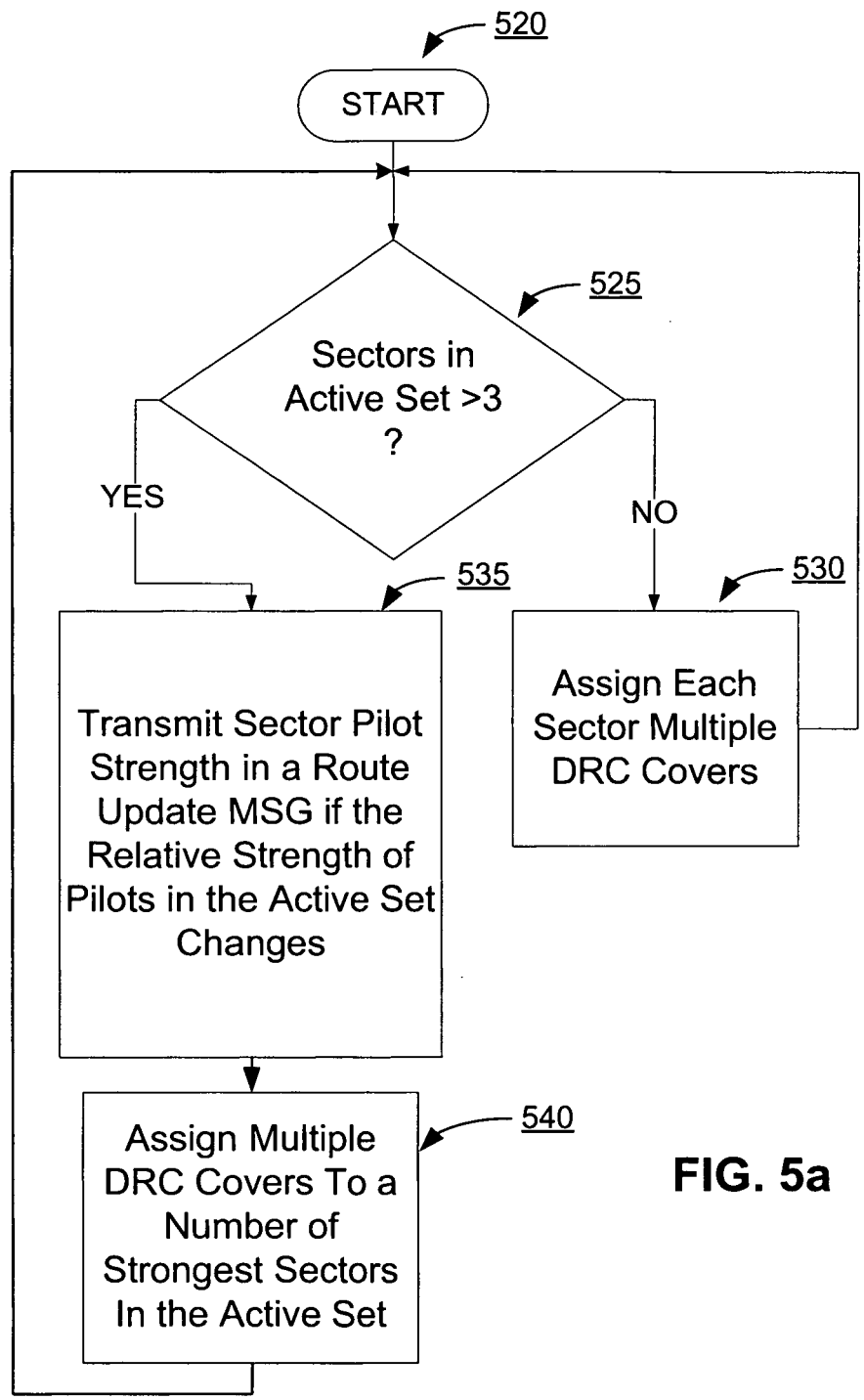
FIGS. 5*a* and 5*b* are flowcharts illustrating the steps executed when assigning multiple DRC covers.

In one embodiment illustrated in FIG. 5a, an AT 106 starts (step 520) by determining whether the number of sectors in the active set is greater than a threshold (which in this embodiment is 3) (step 525). If the answer to step 525 is no, then assign each sector multiple DRC covers (which in this embodiment is 2 DRC covers) (step 530). If the answer to step 525 is yes, then transmit the sector pilot strength in a route update message if the relative strength of pilots in the active set changes (step 535) and then assign multiple (in this case 2) DRC covers to the three strongest sectors in the active set. (step 540). A route update protocol may be used to track which access point 160 is being used for a specific AT 106, and for identifying access points 160 that may be better suited for maintaining a good quality signal as the AT 106 moves throughout the system. As stated above, the AN 122 assigns the DRC covers to the three strongest sectors in the active set (step 540).

Figure 5B:
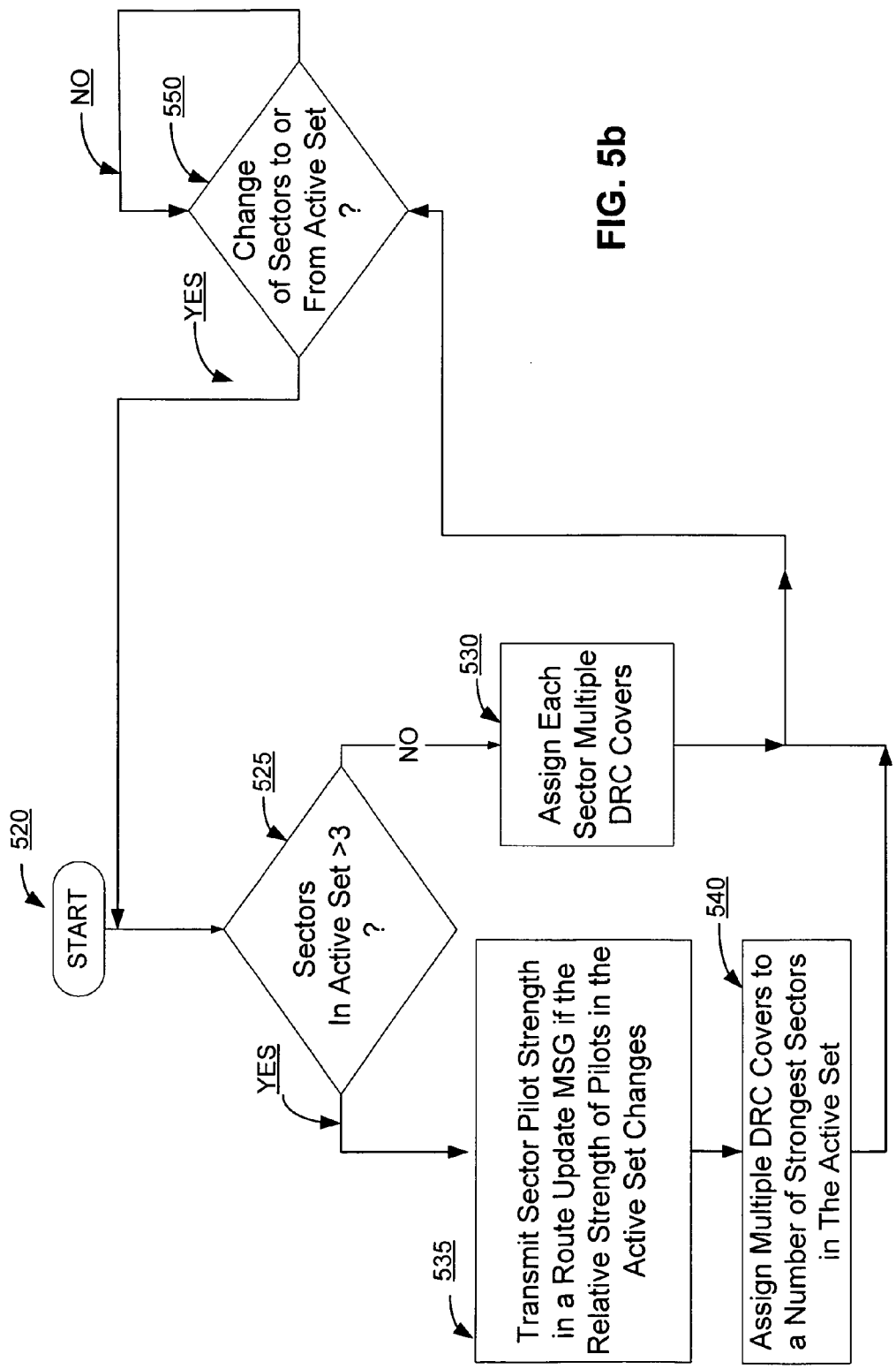

In FIG. 5b an additional step of determining if the number of sectors in the active set changes (step 550) is added. If the answer to step 550 is yes, repeat steps 525, 530, 535 and 540.

Each AT 106 uses the DSC channel to provide the access network early indication of the exact instance in time at which the change in downlink server takes place during soft handoff. As a result, the data queue 172 is already set up at the new server by the time the AT 106 points its DRC to the new server 106. In an alternate embodiment illustrated in FIG. 6, the DRC cover is assigned per sector as a function of the cell 102 indicated by the Data Source Control (DSC). The following is an example of such.

To begin with (step 600), the DSC indicates a cell 102 (step 610) and the DRC covers are assigned for each sector belonging to the cell indicated by DSC (step 620);

(Step 630) Repeat steps 610 and 620 for all cells 102 in the active set, i.e., are all cells identified?

If the answer to step 630 is no, repeat steps 610 and 620 for another cell;

If the answer to step 630 is yes, then determine if there has been a change in cells to or from the active set? (step 640). If the answer to step 640 is yes, then repeat steps 610, 620, 630 and 640. Thus, the assignment of DRC covers changes if a cell 102 is added or dropped from active in the set.

The AT 106 DRC cover usage is a function of channel condition, i.e., the DRC Index, the desired sector, and the desired cell 102.

Figure 7:
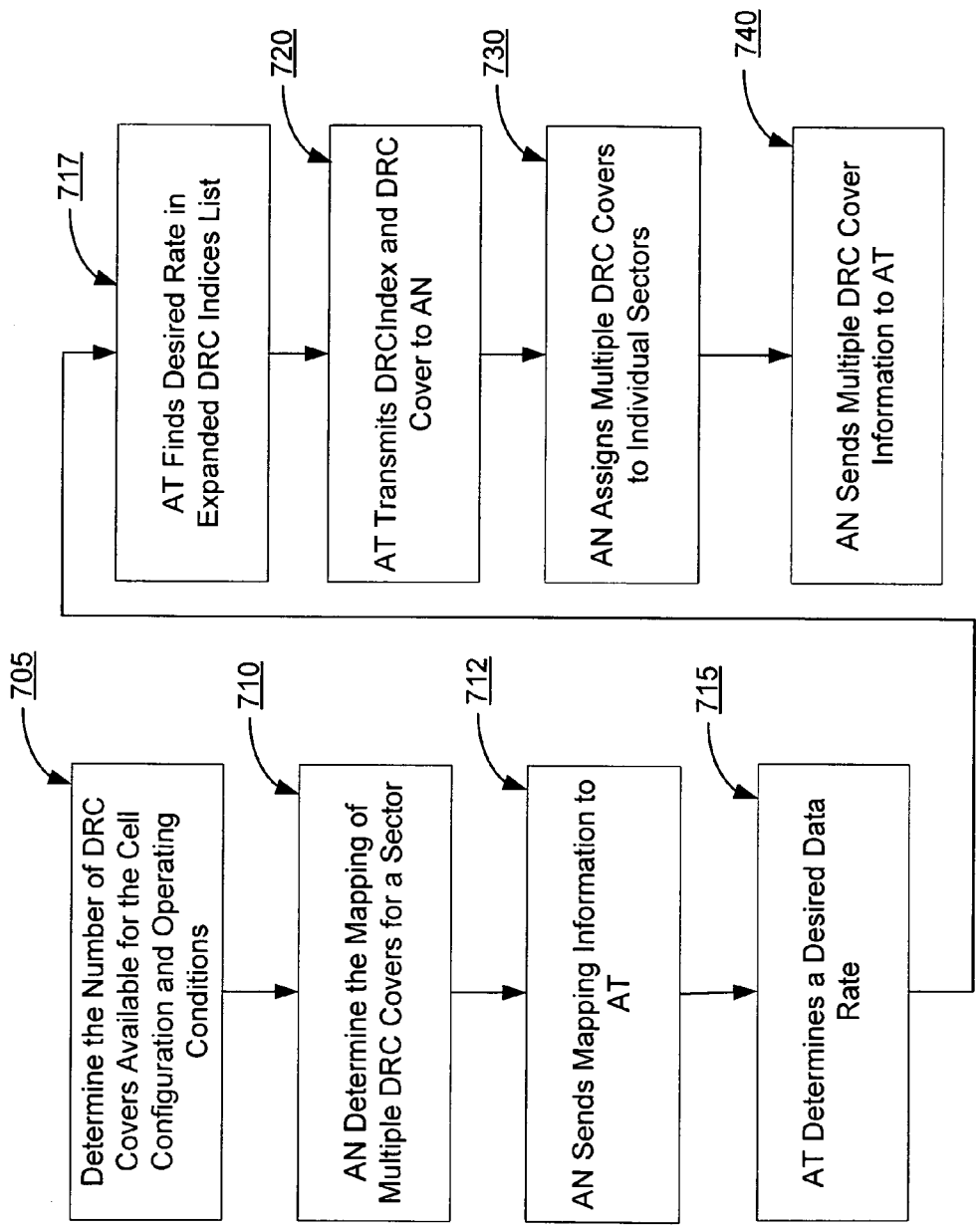
FIG. 7 is a flowchart illustrating the steps executed when assigning multiple DRC covers to a single sector in a wireless communication system.

Note, in one embodiment illustrated in the flowchart of FIG. 7, the AN 122 first determines the number of DRC covers available for the particular cell configuration and current operating conditions (step 705). Once the DRC covers are determined, the AN 122 determines the mapping of multiple DRC covers for a sector to the expanded list of DRC indices. In the present embodiment, the expanded list is a multiple of 16 indices (step 710). The mapping information is sent to the AT 106 (step 712). The AT 106 performs channel quality measures, as well as other link adaptation measures and calculations, to determine a desired data rate (step 715). The desired data rate is found in the expanded DRC index list (step 717) and the combination of DRC Index and DRC Cover is transmitted to the AN 122 to identify the desired data rate in the expanded DRC Indices list (step 720).

The AT 106 has information that multiple DRC covers refer to a same sector. In one example, 3 sectors are in the active set, and the AN 122 assigns multiple DRC Covers to individual sectors. For example, the AN 122 assigns DRC Cover "a" to a first sector, and also assigns DRC Cover "b" to the first sector (step 730). The AN 122 sends this information to the AT 106 (step 740). The AT 106 is then able to use the DRC Cover "a" to identify one set of DRC indices for the first sector, and DRC Cover "b" to identify another set of DRC indices.

Figure 8:
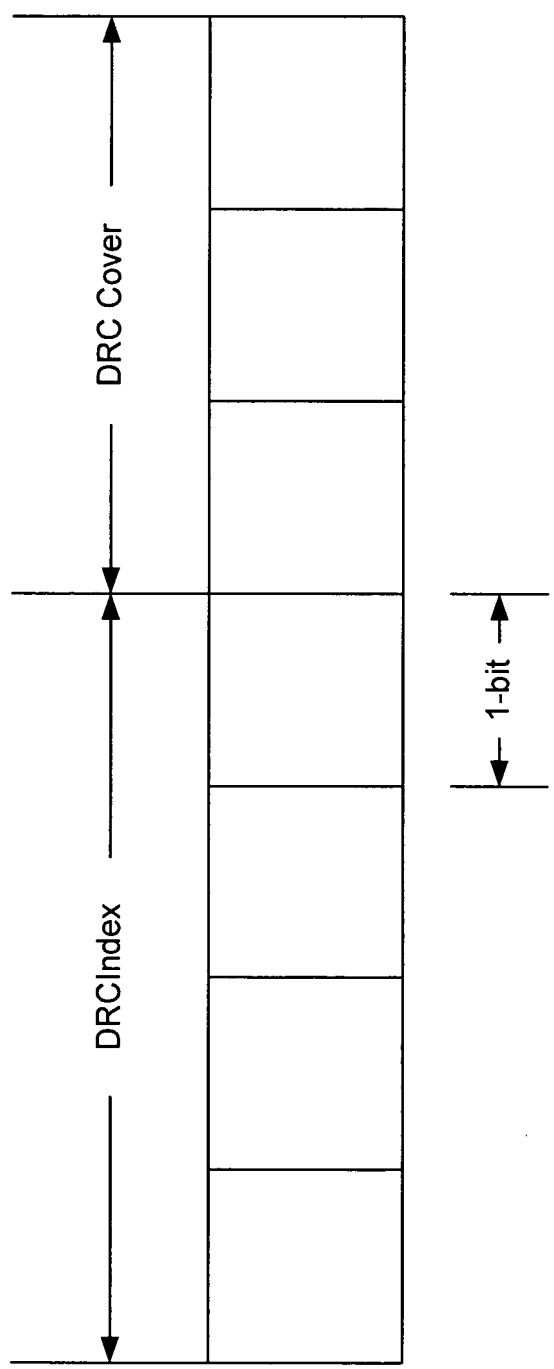
FIG. 8 illustrates an expanded 7-bit DRC index of the present method and apparatus.
Figure 9:
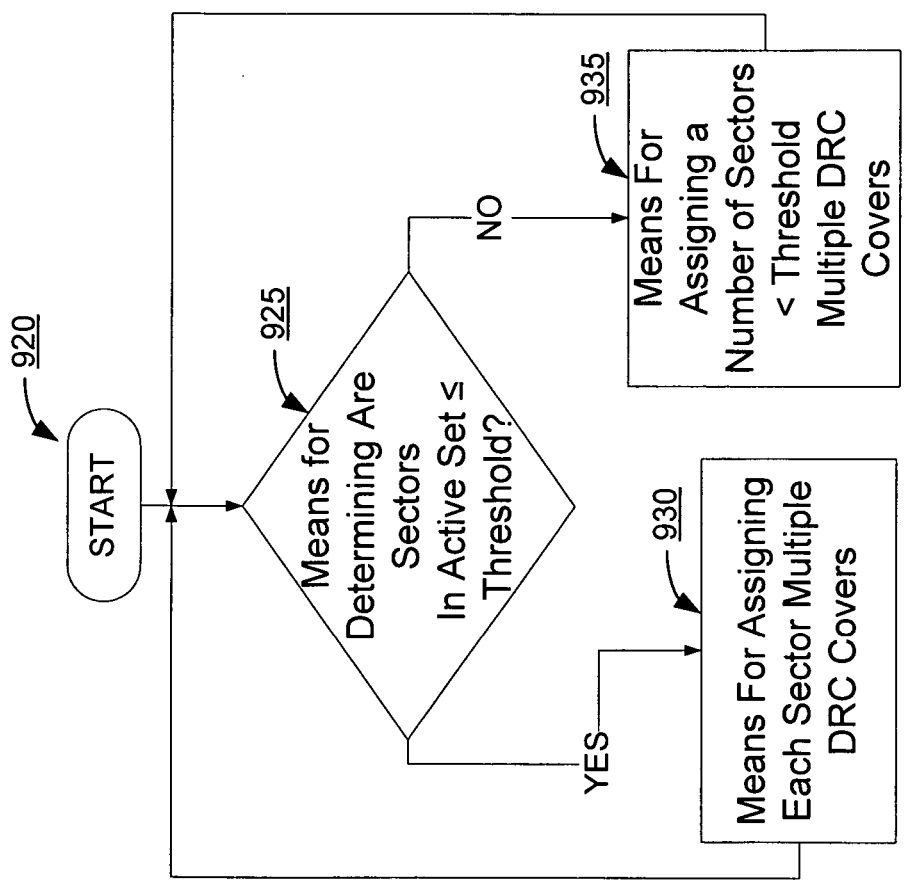
FIG. 9 is a functional block diagram illustrating the means for assigning multiple DRC Covers to a single sector.
Figure 10A:
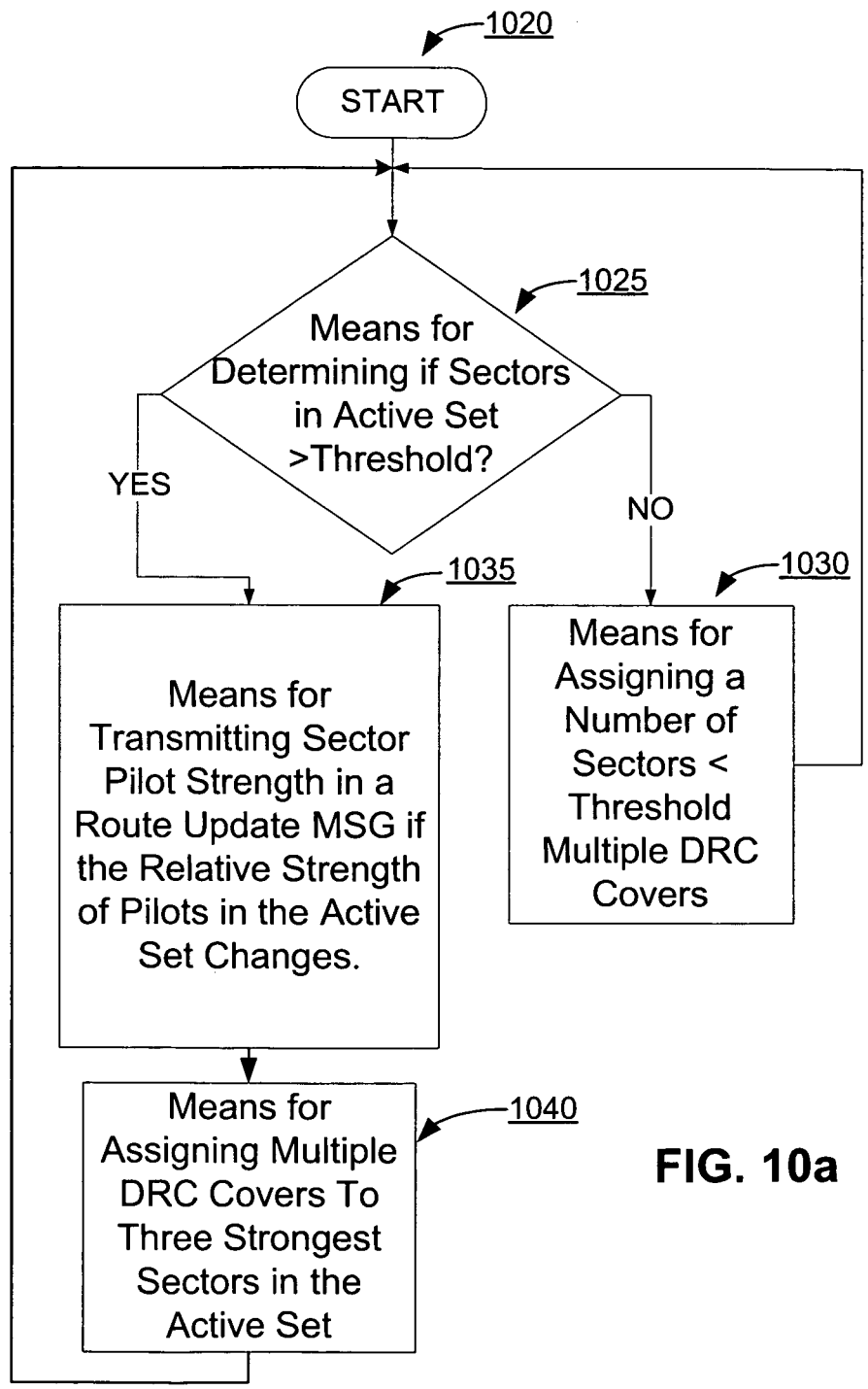
FIGS. 10*a* and 10*b* are functional block diagrams illustrating the means for assigning multiple DRC covers.
Figure 10B:
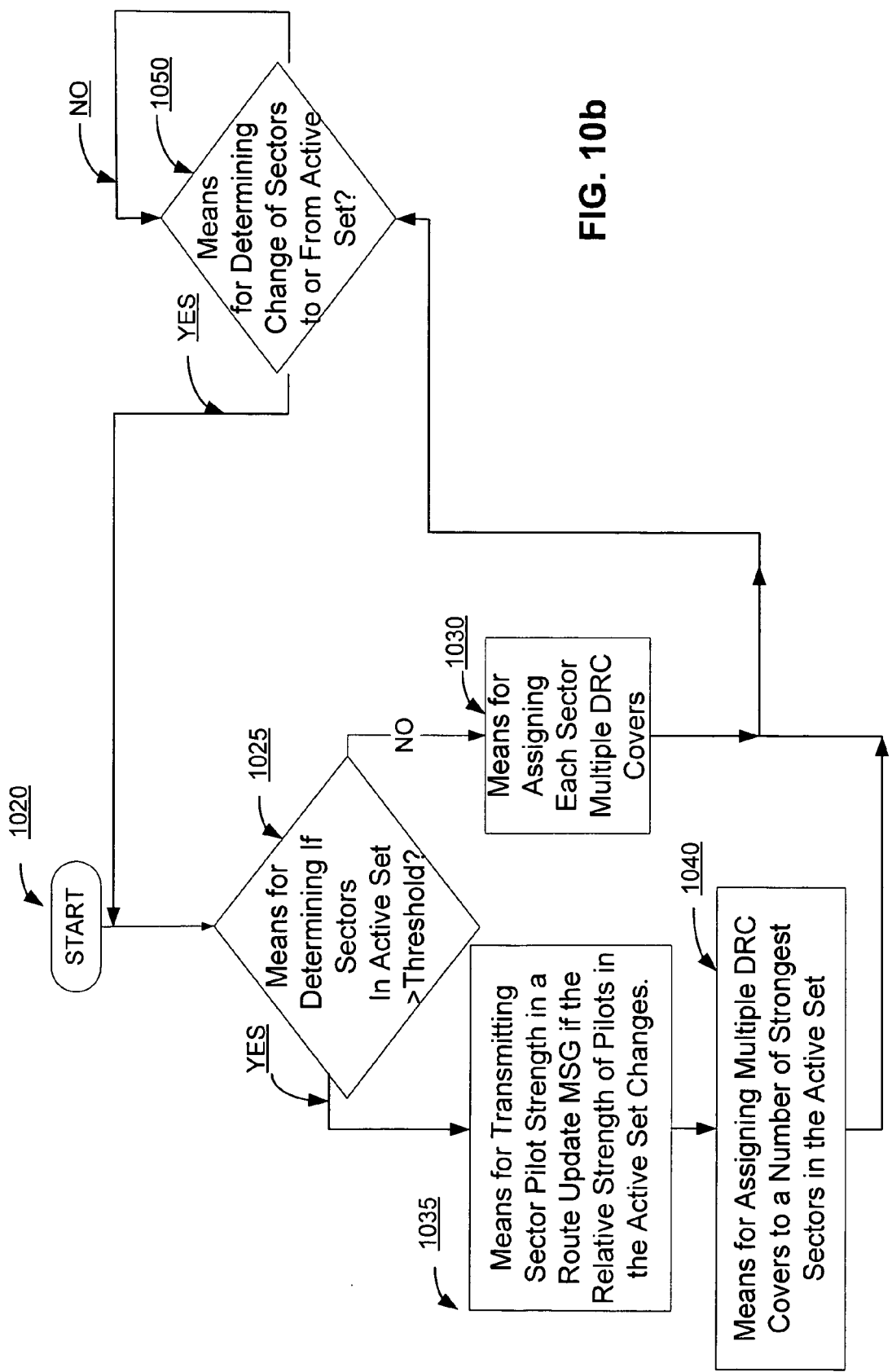
Figure 11:
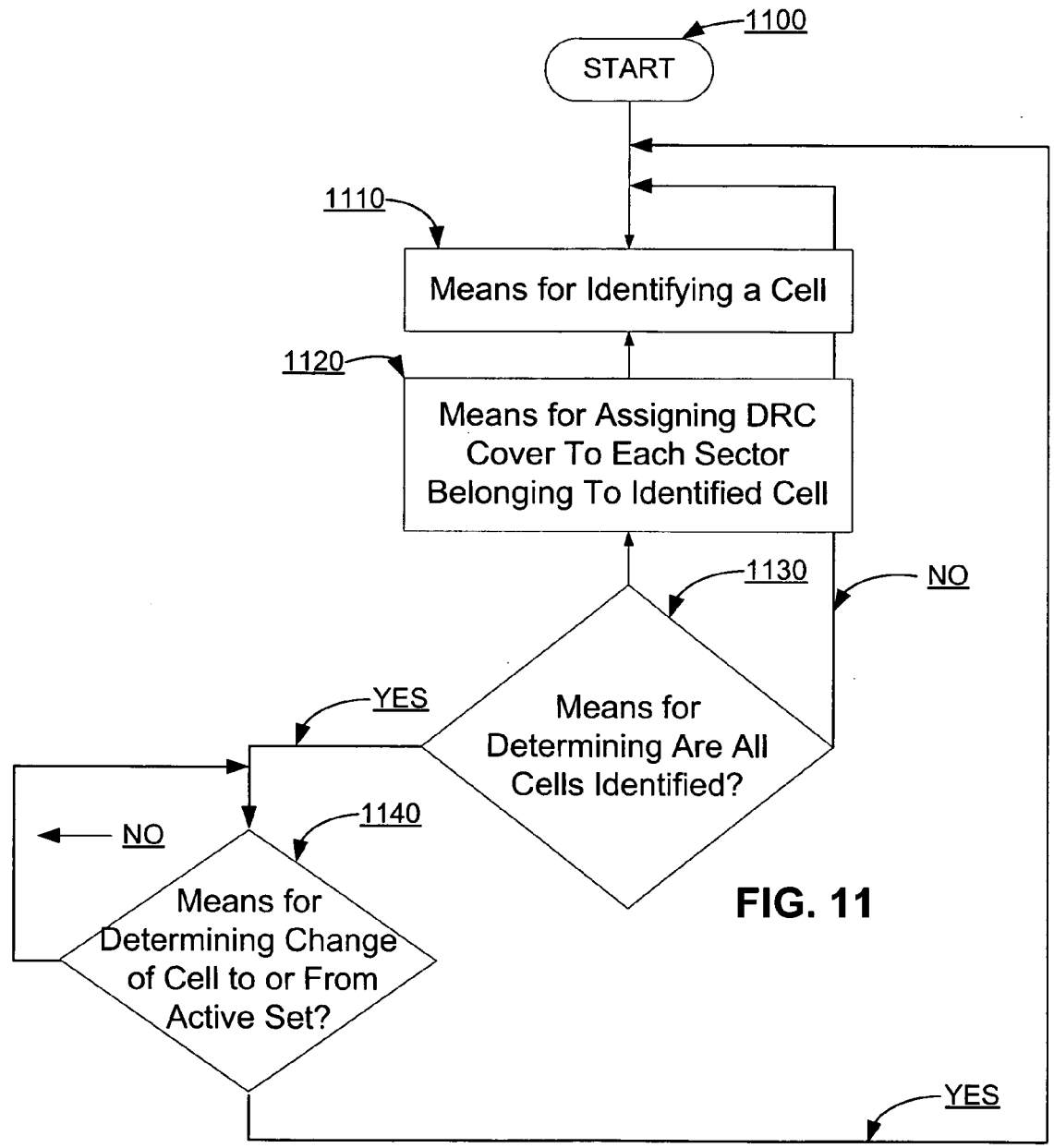
FIG. 11 is a functional block diagram illustrating the means for assigning DRC covers to cells in a wireless communication system.
Figure 12:
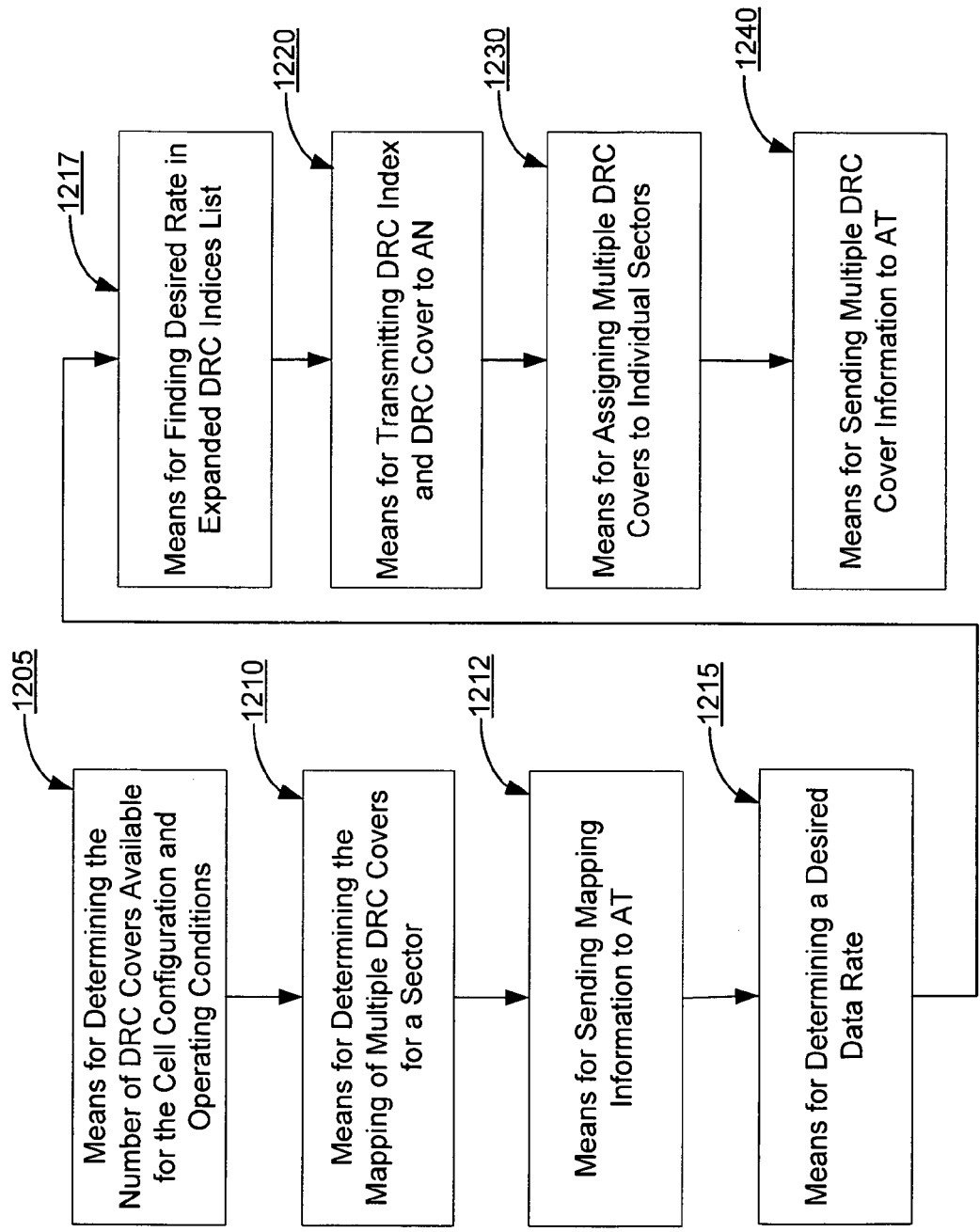
FIG. 12 is a functional block diagram illustrating the means for assigning multiple DRC covers to a single sector in a wireless communication system.

The expanded DRC indices list may be configured in a variety of ways. One embodiment uses the entire bit length of the DRCIndex (4 bits) and the entire bit length of the DRC Cover (3 bits) to access 128 DRC indices i.e., 27 indices, including one DRC value for the NULL cover. See FIG. 8. This embodiment assumes that the AT 106 is assigned only one sector in its active set. The expanded DRC indices may refine the granularity of the available data rates, or may expand the range of data rates. Similarly, granularity may be added to only specific sub-ranges of data rates. There are a variety of ways to assign the expanded DRC indices.

Figure 3:
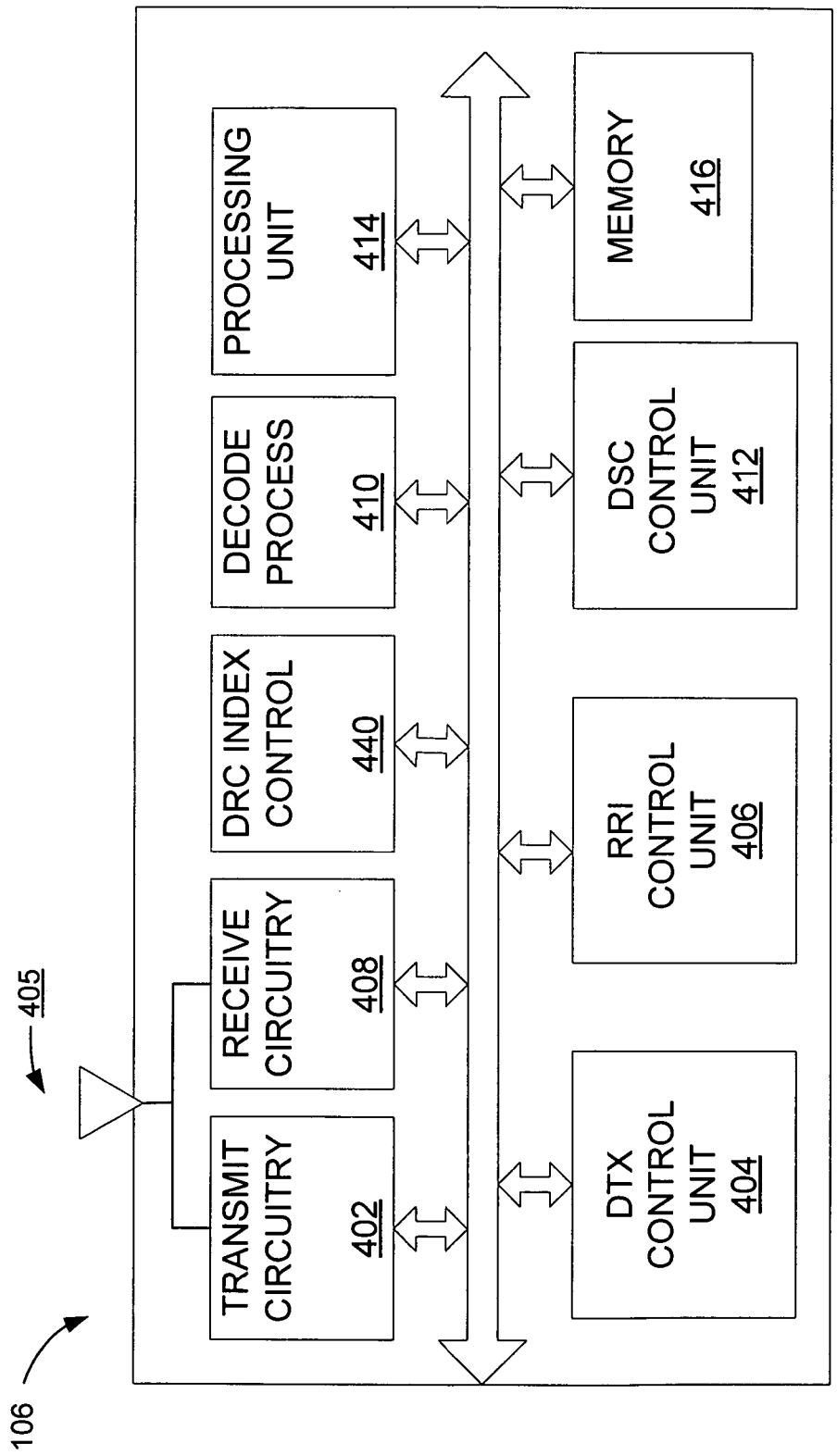
FIG. 3 is an access terminal supporting an expanded DRC Indices List.

The steps executed in the above mention flowcharts may, in one embodiment, be stored in memory 416 as instructions which may be executed by the processor or processor means or processor unit 414 and/or the DRC index control 440 and/or another processor or controller in the remote station 106. See FIG. 3.

The steps executed in the above mention flowcharts may, in one embodiment, be stored in memory 135, 175 as instructions which may be executed by the processor or processor means or processor unit or control unit (e.g., channel schedulers 132, 174) in the access network 122. See FIG. 2.

Figure 6:
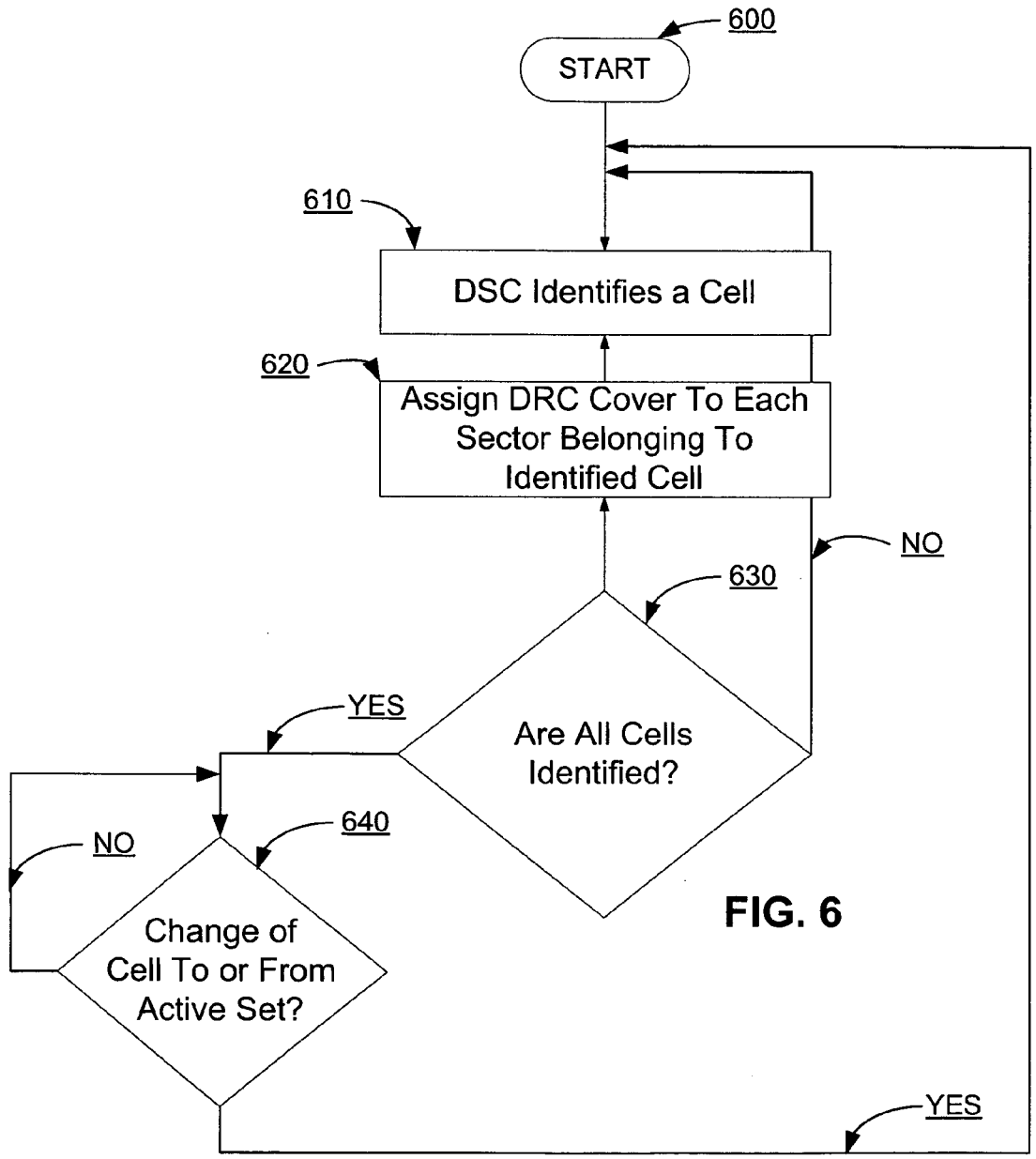
FIG. 6 is a flowchart illustrating the steps executed when assigning DRC covers to cells in a wireless communication system.

The methods and apparatuses of FIGS. 4, 5a, 5b, 6, and 7 described above are performed by corresponding means plus function blocks illustrated in FIGS. 9, 10a, 10b, 11 and 12 respectively. In other words, apparatuses 420, 425, 430 and 435 in FIG. 4 correspond to means plus function blocks 920, 925, 930 and 935 in FIG. 9. Apparatuses 520, 525, 530, 535 and 540 in FIG. 5a is performed by corresponding means plus function blocks 1020, 1025, 1030, 1035 and 1040 in FIG. 10a. Apparatuses 520, 525, 530, 535, 540 and 550 in FIG. 5b is performed by corresponding means plus function blocks 1020, 1025, 1030, 1035, 1040 and 1050 in FIG. 10b. Apparatuses 600, 610, 620, 630, and 640 illustrated in FIG. 6 is performed by corresponding means plus function clocks 1100, 1110, 1120, 1130, and 1140 in FIG. 11. Apparatuses 705, 710, 712, 715, 717, 720, 730 and 740 illustrated in FIG. 7 is performed by corresponding means plus function clocks 1205, 1210, 1212, 1215, 1217, 1220, 1230, and 1240 in FIG. 12.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for use in a wireless communication system, the method comprising:
    identifying a cell indicated by a data source control channel in an active set;
    determining whether a number of sectors in an active set is greater than a threshold;
    assigning more than one of a plurality of non-null Data Rate Control (DRC) covers to at least one sector belonging to the identified cell by:
    assigning more than one of the plurality of non-null DRC covers to each of a plurality of sectors in the active set if an active set size is less than or equal to a threshold number of sectors to increase a number of DRC indices available for selection without increasing the size of a field used for transmission of the DRC indices, and
    assigning more than one of the plurality of non-null DRC covers to some, but not all, of the plurality of sectors in the active set if the active set size is greater than the threshold number of sectors;
    determining whether all cells in the active set are identified;
    assigning one non-null DRC cover to other sectors of other cells if all the cells in the active set are not identified; and
    storing one or more digital signals representing the assignment of the plurality of non-null DRC covers in memory in at least one computing device within said wireless communication system.

2. The method according to claim 1, further comprising:
    creating an expanded DRC indices list corresponding to the number of DRC indices available for selection;
    transmitting one or more wireless signals representing a mapping of at least a portion of the assigned plurality of non-null DRC covers to the expanded DRC indices list to an access terminal; and
    determining the sector and DRC index from the expanded DRC indices list to process one or more requests for transmission as received from the access terminal.

3. The method according to claim 2, further comprising:
    with an access network, receiving one or more signals representing said DRC Index and a previously assigned DRC Cover;
    assigning the plurality of non-null DRC Covers to the sector; and
    transmitting to the access terminal one or more signals representing said plurality of non-null DRC Covers assigned to the sector.

4. The method according to claim 2, wherein said expanded DRC indices list comprises a multiple of 16 indices.

5. The method according to claim 1, further comprising:
    determining whether there has been a change in cells to or from the active set if all said cells in said active set are identified; and
    repeating a), b), c), and d) if there has been a change in cells to or from the active set if all said cells in said active set are identified.

6. The method of claim 1, wherein each of the plurality of non-null DRC covers for the sector corresponds to at least one different DRC index.

7. A method for use in a wireless communication system, the method comprising:
    assigning a plurality of non-null Data Rate Control (DRC) covers to a sector of the wireless communication system to increase a number of DRC indices available for selection; and
    storing one or more digital signals representing the assignment of the plurality of non-null DRC covers in memory in at least one computing device within said wireless communication system;
    wherein assigning the plurality of non-null DRC covers to the sector comprises:
    a) determining whether a number of sectors in an active set is greater than a threshold;
    b) assigning two or more of said non-null DRC covers to each sector in the active set if the number of sectors in the active set is less than or equal to said threshold;
    c) transmitting a sector pilot strength in a route update message if a relative strength of pilots in the active set changes and the number of sectors in the active set is greater than said threshold; and
    d) assigning two or more of said non-null DRC covers to a number of sectors less than said threshold with a relatively strongest pilot signal strength if the number of sectors in the active set is greater than said threshold.

8. The method according to claim 7, further comprising:
    determining whether said number of said sectors in the active set changes; and
    repeating a), b), c), and d) if said number of said sectors in the active set changes.

9. An apparatus for use in a wireless communication system, the apparatus comprising:
    means for identifying a cell indicated by a data source control channel in an active set;
    means for determining whether a number of sectors in an active set is greater than a threshold;
    means for assigning more than one of a plurality of non-null Data Rate Control (DRC) covers to at least one sector belonging to the identified cell, wherein the means for assigning more than one of the plurality of non-null DRC covers to the at least one sector belonging to the identified cell comprises:
    means for assigning more than one of the plurality of non-null DRC covers to each of a plurality of sectors in the active set of the wireless communication system if an active set size is less than or equal to a threshold number of sectors to increase a number of DRC indices available for selection without increasing the size of a field used for transmission of the DRC indices, and
    means for assigning more than one of the plurality of non-null DRC covers to some, but not all, of the plurality of sectors in the active set if the active set size is greater than the threshold number of sectors;
    means for determining whether all cells in the active set are identified;
    means for assigning one non-null DRC cover to other sectors of other cells if all the cells in the active set are not identified; and
    means for storing one or more digital signals representing the assignment of the plurality of non-null DRC covers.

10. The apparatus according to claim 9, further comprising:
  means for creating an expanded DRC indices list corresponding to the number of DRC indices available for selection;
  means for sending one or more wireless signals representing a mapping of at least a portion of the plurality of non-null DRC covers to the expanded DRC indices list to an access terminal; and
  means for determining the sector and DRC index from the expanded DRC indices list to process one or more requests for transmission as received from the access terminal.

11. The apparatus according to claim 10, further comprising:
  means for receiving said DRC Index and a previously assigned DRC Cover;
  means for assigning said plurality of non-null DRC Covers to the sector; and
  means for sending said plurality of non-null DRC Covers assigned to the sector to said access terminal.

12. The apparatus according to claim 10, wherein said expanded DRC indices list comprises a multiple of 16 indices.

13. The apparatus according to claim 9, further comprising:
  means for determining whether there has been a change in cells to or from the active set if all said cells in said active set are identified; and
  means for initiating repetition of the operations of determining, assigning, transmitting, and assigning if there has been a change in cells to or from the active set if all said cells in said active set are identified.

14. An apparatus for use in a wireless communication system, the apparatus comprising:
  means for assigning a plurality of non-null Data Rate Control (DRC) covers to a sector of the wireless communication system to increase a number of DRC indices available for selection;
  means for storing one or more digital signals representing the assignment of the plurality of non-null DRC covers;
  means for determining whether a number of sectors in an active set is greater than a threshold;
  means for assigning two or more of said non-null DRC covers to each sector in the active set if the number of said sectors in the active set is less than or equal to said threshold;
  means for transmitting a sector pilot strength in a route update message if a relative strength of pilots in the active set changes and the number of said sectors in the active set is greater than said threshold; and
  means for assigning two or more of said non-null DRC covers to a number of sectors less than said threshold with a relatively strongest pilot signal strength if the number of said sectors in the active set is greater than said threshold.

15. The apparatus according to claim 14, further comprising:
  means for determining whether said number of said sectors in the active set changes; and
  means for initiating repetition of the operations of determining, assigning, transmitting, and assigning if said number of said sectors in the active set changes.

16. An access terminal, comprising:
  memory; and
  a processor unit configured to:
  identify a cell indicated by a data source control channel in an active set;
  determine whether a number of sectors in an active set is greater than a threshold;
  assign more than one of a plurality of non-null Data Rate Control (DRC) covers to at least one sector belonging to the identified cell by:
    assigning more than one of the plurality of non-null DRC covers to each of a plurality of sectors in the active set of a wireless communication system if an active set size is less than or equal to a threshold number of sectors to increase a number of DRC indices available for selection without increasing the size of a field used for transmission of the DRC indices, and
    assigning more than one of the plurality of non-null DRC covers to some, but not all, of the plurality of sectors in the active set if the active set size is greater than the threshold number of sectors;
  determine whether all cells in the active set are identified; and
  assign one non-null DRC cover to other sectors of other cells if all the cells in the active set are not identified.

17. The access terminal according to claim 16, wherein said processor unit is further configured to:
  obtain an expanded DRC indices list corresponding to the number of DRC indices available for selection;
  obtain a mapping of DRC covers to the expanded DRC indices; and
  use the mapping to determine a sector and DRC index from the DRC indices list to generate one or more requests for transmission for an access network.

18. The access terminal according to claim 17, said DRC indices being based, at least in part, on:
  said DRC Index and a previously assigned DRC Cover as provided to said access network by said access terminal.

19. The access terminal according to claim 17, wherein said expanded DRC indices list comprises a multiple of 16 indices.

20. The access terminal according to claim 16, said DRC indices being further based, at least in part, on:
  a determination of whether there has been a change in cells to or from the active set if all said cells in said active set are identified; and
  a repeat of a), b), c), and d) if there has been a change in cells to or from the active set if all said cells in said active set are identified.

21. An access terminal, comprising:
  memory; and
  a processor unit being responsive to an increased number of Data Rate Control (DRC) indices available for selection as stored in said memory as a result of having a plurality of non-null DRC covers assigned to a sector of a wireless communication system;
  said DRC indices being based, at least in part, on:
  a) a determination of whether a number of said sectors in an active set is greater than a threshold;
  b) an assignment of two or more of said non-null DRC covers to each sector in the active set if the number of said sectors in the active set is less than or equal to said threshold;
  c) a sector pilot strength in a route update message if a relative strength of pilots in the active set changes and the number of said sectors in the active set is greater than said threshold; and d) an assignment of two or more non-null DRC covers to a number of sectors less than said threshold with a relatively strongest pilot signal strength if the number of said sectors in the active set is greater than said threshold.

22. The access terminal according to claim 21, said DRC indices being further based, at least in part, on:
   a determination of whether said number of said sectors in the active set changes; and
   a repeat of a), b), c), and d) if said number of said sectors in the active set changes.

23. An access network, comprising:
   at least one device comprising memory and at least one channel scheduler to:
   identifying a cell indicated by a data source control channel in an active set;
   determining whether a number of sectors in an active set is greater than a threshold;
   assigning more than one of a plurality of non-null Data Rate Control (DRC) covers to at least one sector belonging to the identified cell by:
   assigning more than one of the plurality of non-null DRC covers to each of a plurality of sectors in the active set of a wireless communication system if an active set size is less than or equal to a threshold number of sectors to increase a number of DRC indices available for selection without increasing the size of a field used for transmission of the DRC indices, and
   assigning more than one of the plurality of non-null DRC covers to some, but not all, of the plurality of sectors in the active set if the active set size is greater than the threshold number of sectors;
   determining whether all cells in the active set are identified;
   assigning one non-null DRC cover to other sectors of other cells if all the cells in the active set are not identified; and
   store one or more digital signals in the memory representing the assignment of the plurality of non-null DRC covers.

24. The access network according to claim 23, said channel scheduler to further:
   create an expanded DRC indices list corresponding to the number of DRC indices available for selection;
   initiate transmission of a mapping of at least a portion of the assigned plurality of non-null DRC covers to the expanded DRC indices list to an access terminal; and
   determine a sector and DRC index from the expanded DRC indices list on requests for transmission from the access terminal.

25. The access network according to claim 24, said channel scheduler to further:
   obtain said DRC Index and a previously assigned DRC Cover;
   assign the plurality of non-null DRC Covers to the sector; and
   initiate transmission of said plurality of non-null DRC Covers assigned to the sector to said access terminal.

26. The access network according to claim 24, wherein said expanded DRC indices list comprises a multiple of 16 indices.

27. The access network according to claim 23, said channel scheduler to further:
   determine whether there has been a change in cells to or from the active set if all said cells in said active set are identified; and
   repeat a), b), c), and d) if there has been a change in cells to or from the active set if all said cells in said active set are identified.

28. An access network, comprising:
   at least one device comprising memory and at least one channel scheduler to:
   assign a plurality of non-null Data Rate Control (DRC) covers to a sector of a wireless communication system to increase a number of DRC indices available for selection;
   store one or more digital signals in the memory representing the assignment of the plurality of non-null DRC covers;
   wherein assigning the plurality of non-null DRC covers comprises:
   a) determining whether a number of said sectors in an active set is greater than a threshold;
   b) assigning two or more of said non-null DRC covers to each sector in the active set if the number of said sectors in the active set is less than or equal to said threshold;
   c) initiating transmission of a sector pilot strength in a route update message if a relative strength of pilots in the active set changes and the number of said sectors in the active set is greater than said threshold; and
   d) assigning two or more of said non-null DRC covers to a number of sectors less than said threshold with a relatively strongest pilot signal strength if the number of said sectors in the active set is greater than said threshold.

29. The access network according to claim 28, said channel scheduler to further:
   determine whether said number of said sectors in the active set changes; and
   repeat a), b), c), and d) if said number of said sectors in the active set changes.

30. A non-transitory processor-readable storage medium that is configured to:
   cause at least one computing device in a wireless communication system to identify a cell indicated by a data source control channel in an active set;
   cause the at least one computing device to determine whether a number of sectors in an active set is greater than a threshold;
   cause the at least one computing device to assign more than one of a plurality of non-null Data Rate Control (DRC) covers to at least one sector belonging to the identified cell by:
   assigning more than one of the plurality of non-null DRC covers to each of a plurality of sectors of the wireless communication system in the active set if an active set size is less than or equal to a threshold number of sectors to increase a number of DRC indices available for selection without increasing the size of a field used for transmission of the DRC indices, and
   assigning more than one of the plurality of non-null DRC covers to some, but not all, of the plurality of sectors in the active set if the active set size is greater than the threshold number of sectors;
   cause the at least one computing device to determine whether all cells in the active set are identified;
   cause the at least one computing device to assign one non-null DRC cover to other sectors of other cells if all the cells in the active set are not identified; and
   cause the at least one computing device to store one or more digital signals representing the assignment of the plurality of non-null DRC covers in memory of the at least one computing device within said wireless communication system.

* * * * *